United States Patent [19]
Schroeder et al.

[11] Patent Number: 5,944,227
[45] Date of Patent: Aug. 31, 1999

[54] DISPENSER FOR MULTIPLE CARTRIDGES

[75] Inventors: Wesley A. Schroeder, Seville; William E. Bartasevich, Kent; David D. Hayes, Hartville; Stanley A. Mathey, Wooster, all of Ohio

[73] Assignee: GOJO Industries, Inc., Cuyahoga Falls, Ohio

[21] Appl. No.: 09/110,420

[22] Filed: Jul. 6, 1998

[51] Int. Cl.⁶ ................................................ B67D 5/60
[52] U.S. Cl. ...................................... 222/144.5; 222/214
[58] Field of Search ........................... 222/144.5, 214, 222/185.1, 207, 212, 213, 105

[56] References Cited

U.S. PATENT DOCUMENTS

| | | | |
|---|---|---|---|
| 3,081,911 | 3/1963 | Scholle | 222/107 |
| 3,089,622 | 5/1963 | Westlake, Jr. | 222/183 |
| 3,117,695 | 1/1964 | Cox, Jr. | 222/105 |
| 3,741,439 | 6/1973 | Vehrs | 222/103 |
| 3,768,704 | 10/1973 | Beguin | 222/207 |
| 3,870,201 | 3/1975 | Asplund | 222/207 |
| 4,018,363 | 4/1977 | Cassia | 222/80 |
| 4,130,224 | 12/1978 | Norman et al. | 222/185 |
| 4,256,242 | 3/1981 | Christine | 222/207 |
| 4,349,133 | 9/1982 | Christine | 222/183 |
| 4,391,308 | 7/1983 | Steiner | 141/18 |
| 4,391,309 | 7/1983 | Steiner | 141/18 |
| 4,394,938 | 7/1983 | Frassanito | 222/207 |
| 4,621,749 | 11/1986 | Kanfer | 222/153 |
| 4,895,276 | 1/1990 | Maldonado | 222/145.5 |
| 5,042,691 | 8/1991 | Maldonado | 222/144.5 |
| 5,265,772 | 11/1993 | Bartasevich et al. | 222/214 |
| 5,353,963 | 10/1994 | Gorski et al. | 222/214 |
| 5,697,526 | 12/1997 | Lee | 222/214 |

*Primary Examiner*—Philippe Derakshani
*Attorney, Agent, or Firm*—Reese Taylor

[57] ABSTRACT

A dispenser for fluid materials in which at least two replaceable cartridges having collapsible tubes for conducting the material to nozzles on the distal ends of the tubes. The dispenser includes a movable carriage which releasably holds the tubes and carries a platen against which the tubes may be collapsed to expel the material. The dispenser cover carries an operating handle bearing a compression pad. The carriage is movable to bring one or the other of the tubes into alignment with the compression pad so that the selected tube can be collapsed against the platen upon actuation of the operating handle.

9 Claims, 6 Drawing Sheets

DISPENSER FOR MULTIPLE CARTRIDGES

RELATED PATENT APPLICATIONS

None.

FIELD OF THE INVENTION

This invention relates in general to wall-mounted dispensers for liquid products, such as soap, and relates in particular to a dispenser capable of containing multiple refill cartridges for the soap or other material, with the dispenser having the additional capability of switching between the two cartridges.

BACKGROUND OF THE INVENTION

The general art of dispensing material in liquid form from dispensers is rather voluminous in that there are various known types of counter- and wall-mounted dispensers capable of dispensing a measured dose of material, such as, for example, soap, hand cleaner or lotion, upon the application of hand pressure to either push or pull a dispensing arm to actuate valves or other means to dispense a predetermined amount of the material. The present invention may be considered to fall into the general field of dispensers of this type and, more particularly, of the wall-mounted type.

Further, the prior art, such as Bartasevich U.S. Pat. No. 5,265,772, discloses that it is known in the prior art to provide a replaceable cartridge so that the dispenser can be more or less permanently mounted on the wall or other supporting surface and with the material then being dispensed through the dispenser from the cartridge or refill package which can be replaced when its contents are exhausted.

Such refill cartridges commonly comprise what are known as "bag-in-box" containers which generally comprise a rigid or semi-rigid box, with a tearaway front. A collapsible bag, which actually contains the material to be dispensed is received within the box. The bag has a dispensing tube which projects therefrom and terminates in a nozzle. Once the tearaway front of the box is removed, the tube and nozzle of the bag can be extended and fitted into suitable fitments in the dispenser so as to position the tube so that it can be acted on by a compression member. Examples of arrangements of this general type can be seen in Scholle U.S. Pat. No. 3,081,911; Westlake U.S. Pat. No. 3,089,622; and Cox U.S. Pat. No. 3,117,695.

Generally, dispensers of this type involve a wide variety of bag, box and dispenser combinations and examples can be seen in many of those prior art patents.

Specifically, containers of the bag-in-box type referred to above are often combined with wall-mounted dispensers which include various designs of compression members for collapsing the tubes and forcing a measured amount of material onto the hand of the user. Examples of this art may be seen in Vehrs U.S. Pat. No. 3,741,439; Beguin U.S. Pat. No. 3,768,704; Asplund U.S. Pat. No. 3,870,201; Cassia U.S. Pat. No. 4,018,363; Norman U.S. Pat. No. 4,130,224; Christine U.S. Pat. No. 4,256,242; Christine U.S. Pat. No. 4,349,133; Steiner U.S. Pat. No. 4,391,308; Steiner U.S. Pat. No. 4,391,309; and Frassanito U.S. Pat. No. 4,394,938.

Perhaps the best exemplar of this type arrangement can be seen in Kanfer U.S. Pat. No. 4,621,749 wherein the dispenser disclosed therein includes a back plate for wall mounting purposes and a cover hingedly connected to the back plate and movable between open and closed positions with respect thereto. The back plate has a support shelf for receipt of the box and fitments for receiving the dispensing tube as well as a compression platen against which the tube can be compressed.

The cover includes an operating handle which carries a compression member so that, when the cover is closed, the handle can be moved inwardly, whereby the compression member may collapse the tube against the compression platen to force a measured amount of material through the nozzle and onto the hand of the user.

While the prior art referred to above, and particularly that of the just-mentioned Kanfer patent, has found widespread commercial acceptance, it is believed that still further improvements can be made.

For example, several of the prior art patents referred to above disclose sight windows in the front of the cover so that one may observe the collapsible bag and gauge the amount of soap remaining. The practice usually is that when the quantity of soap remaining in the bag is exhausted or almost so, the cover can be opened and the box and bag replaced. However, inasmuch as there are some practical limitations on the size of the dispenser as well as the size of the replaceable cartridges, this sometimes requires more frequent replacement than is convenient for the end user. Furthermore, it may sometimes be the case that more than one type of material may be desired to be dispensed from a single container.

Therefore, it is believed to be advantageous to provide a container which can hold multiple replaceable cartridge units with switching means which make it possible to switch from one cartridge to the other as desired. In that way, exhaustion of one box will not render the dispenser useless and the useful capacity thereof may be doubled. An example of this approach can be seen in Maldonado U.S. Pat. Nos. 4,895,276 and 5,042,691 wherein disposable cartridges of the general type under discussion are mounted in the dispenser and the compression member which engages and collapses the tube is moved from side to side to engage one or the other of the tubes.

While this arrangement is presumed to be operable for the purpose for which it is designed, it is also believed desirable to maintain the compression member in a constant position relative to the overall dispenser to protect it against excessive damage during extended use because the handle and pressure member are the elements of the combination which receive the most severe stress during use.

SUMMARY OF THE INVENTION

Accordingly, it is a principal object of this invention to provide a dispenser of the general type described above having the capability of simultaneously containing at least two individual replacement cartridges and to provide switching means which permit one to selectively dispense material from one or the other of the individual containers.

In furtherance of this general object, it has been found that a movable tube carriage can be mounted within the dispenser on the back plate for reception and location of the tubes and a carriage selector lever can be provided on the cover so that it is accessible from the outside of the dispenser. In this way, the carriage, and thus the tubes, can be moved into and out of alignment with the compression member making it possible to selectively dispense material from one or the other of the cartridges without movement of the compression member itself.

Accordingly, production of an improved dispensing apparatus of the type above described becomes the principal object of this invention with other objects thereof becoming more apparent upon a reading of the following brief specification considered and interpreted in view of the accompanying drawings.

BRIEF DESCRIPTION OF THE PREFERRED EMBODIMENTS

Figure 1:
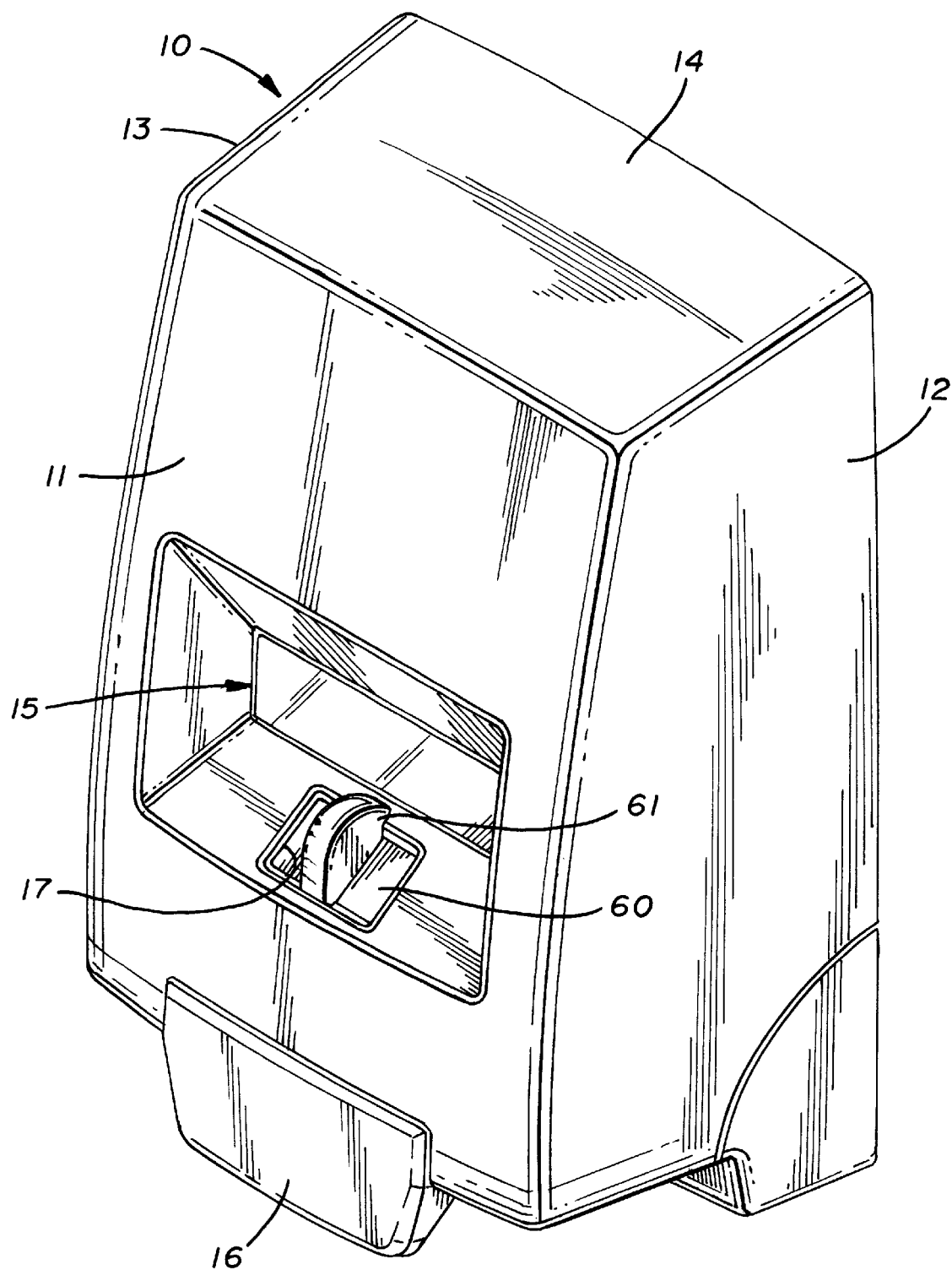
FIG. 1 is a perspective view of the improved dispenser.
Figure 2:
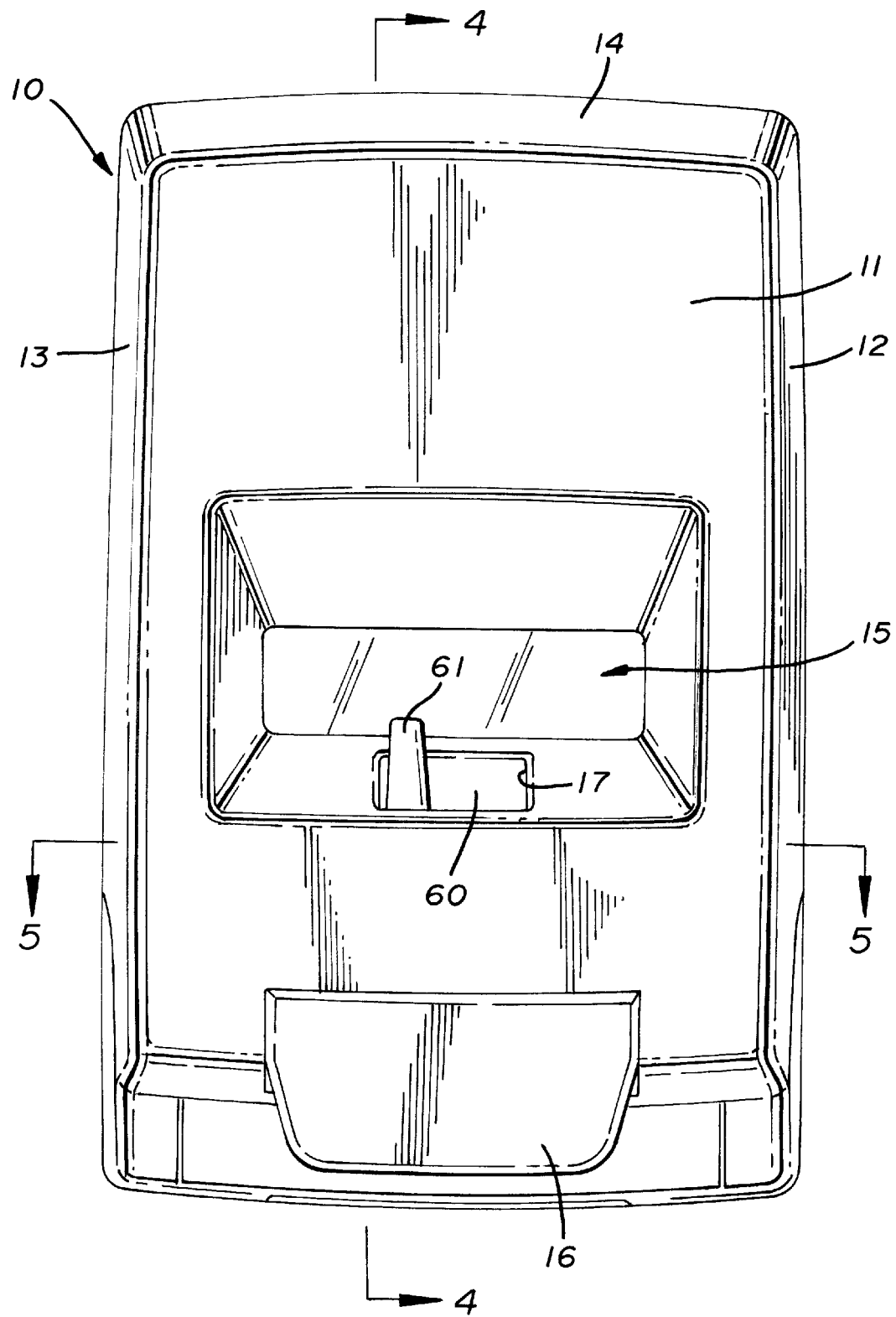
FIG. 2 is a front elevational view thereof.
Figure 4:
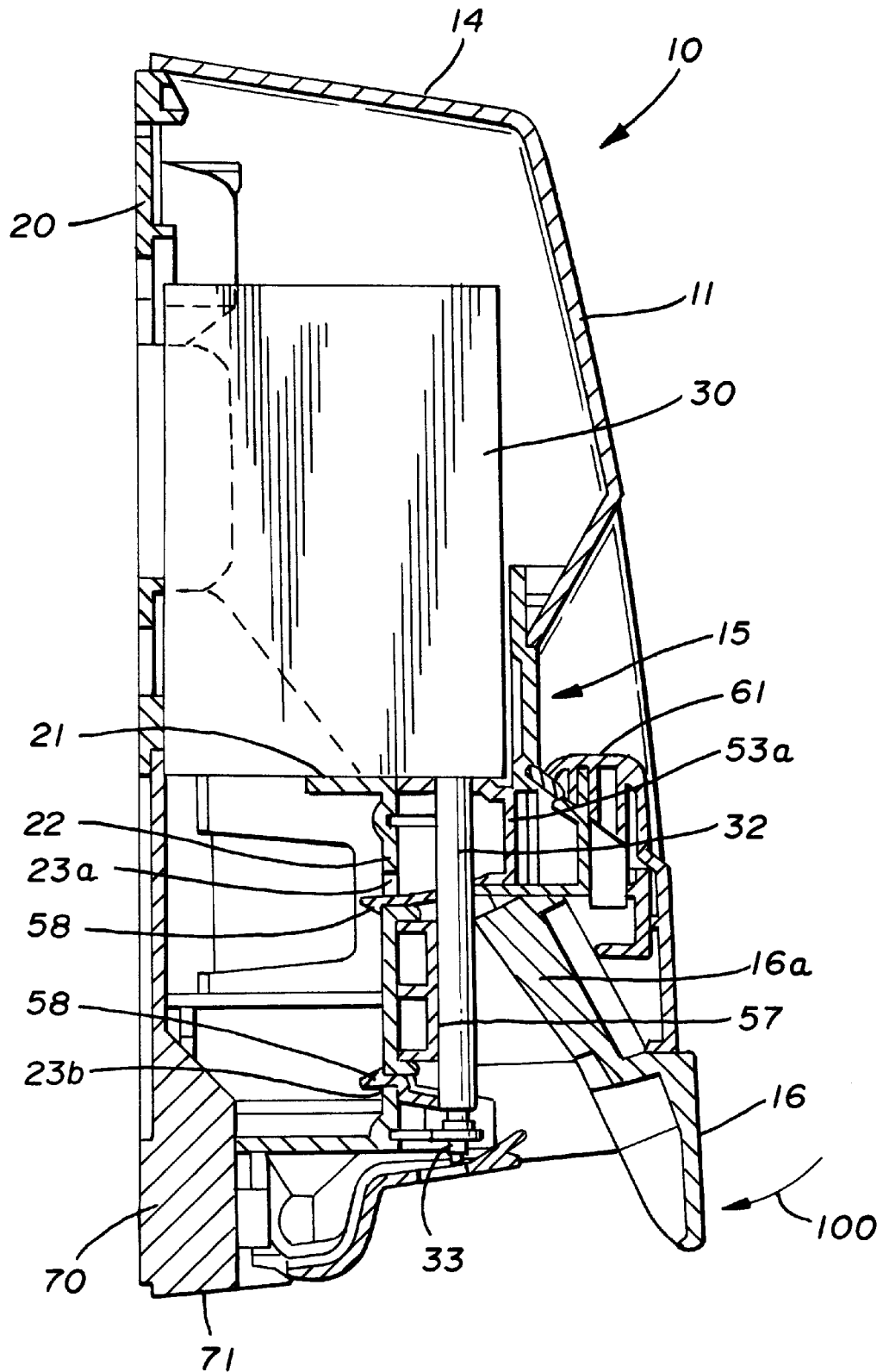
FIG. 4 is a sectional view taken along the line 4—4 of FIG. 2.
Figure 7:
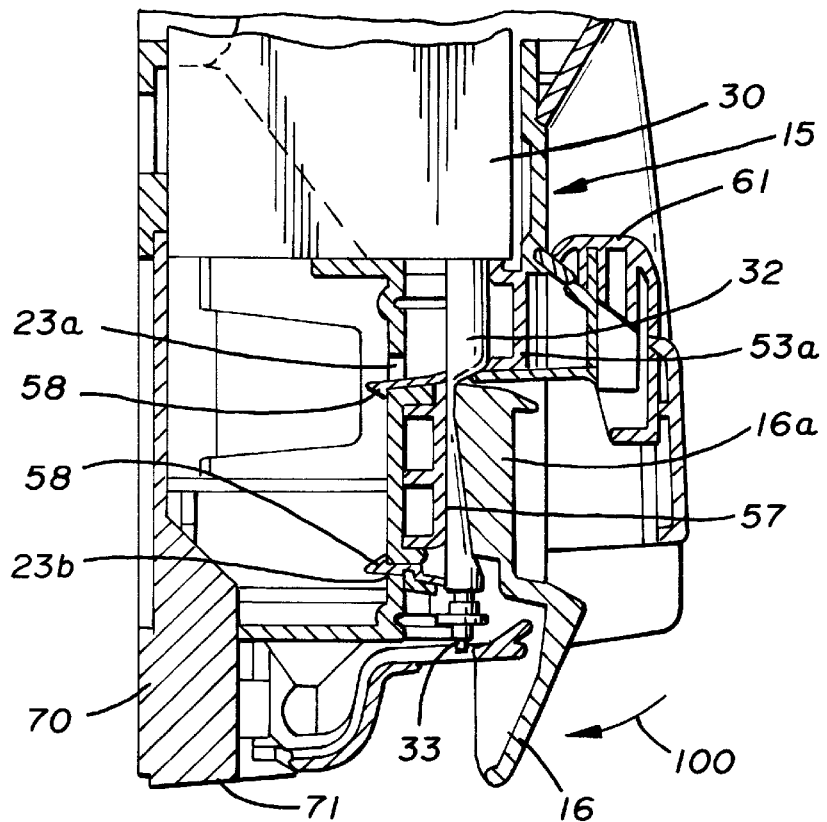
FIG. 7 is an enlarged view taken from FIG. 4 showing the pressure member in the collapsing position.

Referring first then to FIGS. 1 and 2 of the drawings, it will be seen that the dispenser, generally indicated by the numeral 10, includes a front cover 11 having sidewalls 12 and 13 and a top wall 14. As can be seen in FIGS. 4 and 7 of the drawings, the front cover is hinged to the back plate 20, as at 60, and can be secured in place by latching means 70. In that regard, the latching mechanism 70 is similar to that shown in Bartasevich U.S. Pat. No. 5,265,772, the teachings of which are incorporated herein by reference to the extent that they are applicable.

That is, the latch can be disengaged by upward pressure on bottom surface 71. Suffice it to say at this point that a latch member is accessible from beneath the front cover and can be moved upwardly to unlatch the cover and permit it to swing open to permit access to the interior of the dispenser. Within the scope of the present application, the latching means are disclosed for illustrative purposes only and latching and/or locking mechanisms other than those disclosed could also be employed.

Referring still then to FIGS. 1 and 2 of the drawings, the front cover has a sight window 15 and an operating handle 16. Sight window 15 is merely a clear material permitting one to view the interior of dispenser 10 when cover 11 is closed. Handle 16 is pivotally mounted on cover 11 and is movable from the position shown in FIG. 4 of the drawings inwardly to the position shown in FIG. 7 of the drawings in the direction of the arrow 100. Hand pressure on the handle 16 will thus pivot it inwardly to collapse the tube 32 against a compression platen, as clearly shown by comparing FIGS. 4 and 7, and as will be more fully described below.

Also received on the front cover is an elongate opening 17 through which projects the selector lever 61. This selector lever 61 is carried on one side of a slide plate 60 which is, in turn, slidably carried by the cover 11. Slide plate 60 has a bifurcated, inwardly-projecting engagement member 62 projecting from its side opposite selector lever 61 so as to extend into the dispenser 10 when cover 11 is closed for engagement with the tube carriage as will be described.

Figure 3:
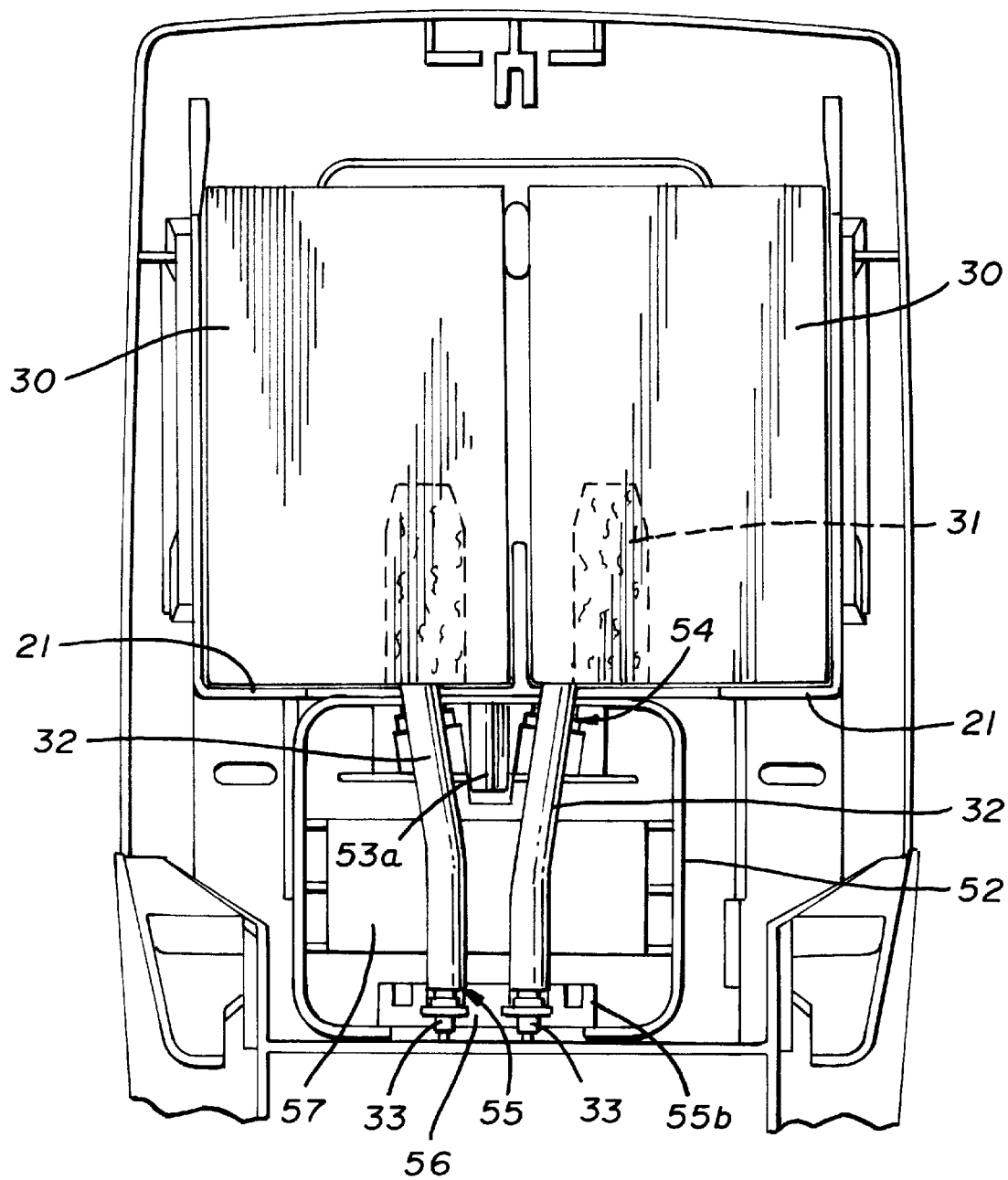
FIG. 3 is a front elevational view thereof with the front cover removed.

Turning then to FIGS. 3 and 4 of the drawings, it will be seen that, interiorly, the dispenser 10 holds two refill cartridges 30. Each of these refill cartridges 30 contains a collapsible bag 31 and a dispensing tube 32 and nozzle 33. These boxes rest side by side on the ledge or shelf 21 in the interior of the dispenser and can be readily replaced once the cover 11 has been opened.

Figure 5:
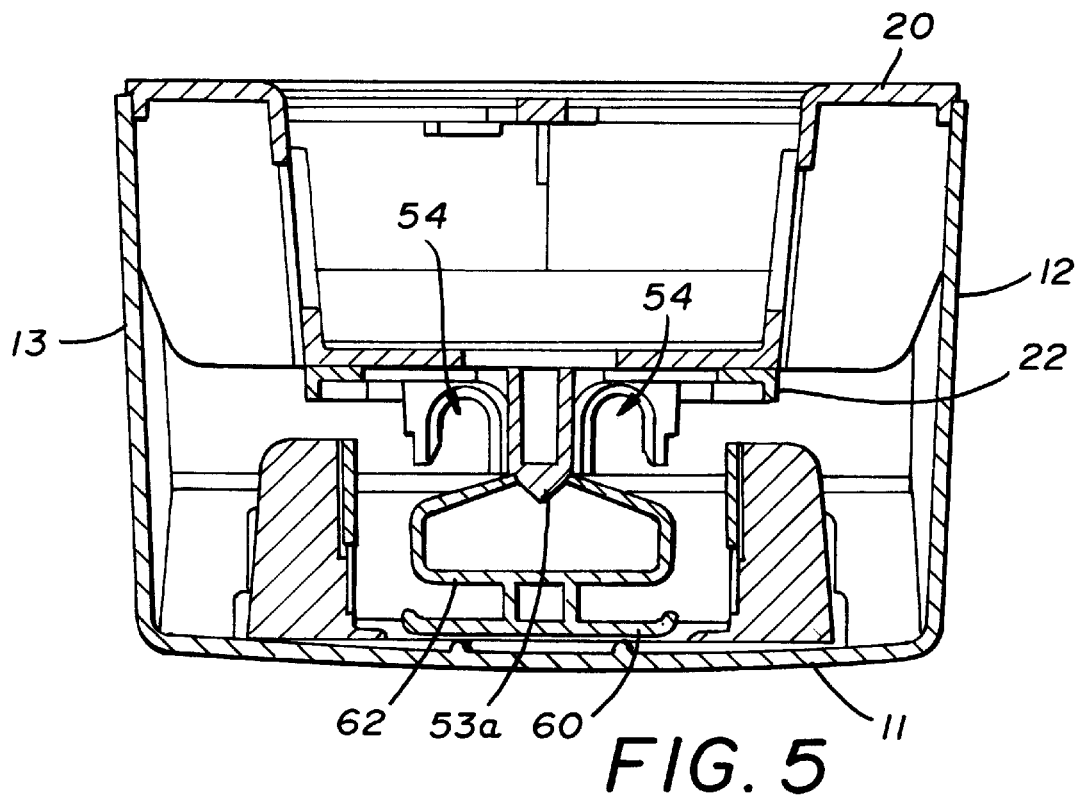
FIG. 5 is a sectional view taken along the line 5—5 of FIG. 2.
Figure 8:
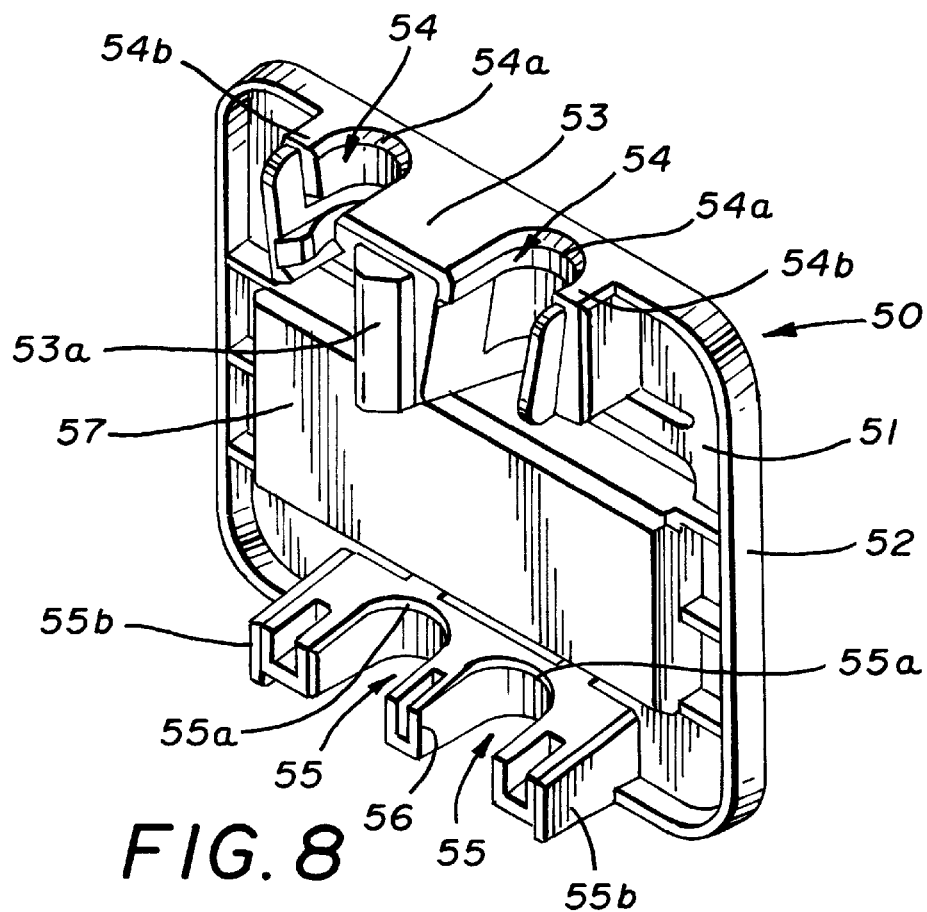
Figure 6:
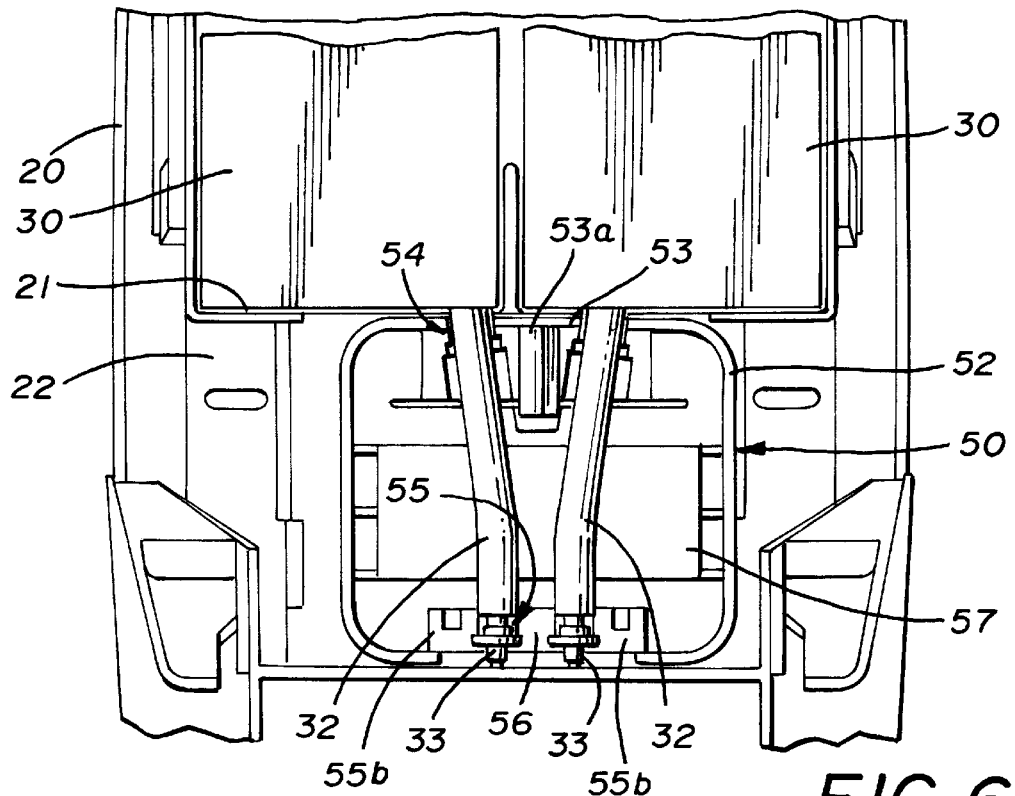
FIG. 6 is an enlarged front elevational view taken from FIG. 3 showing the activating means switched to a different position.

Also received interiorly of the dispenser 10 is a tube carriage, generally indicated by the numeral 50 in FIGS. 5, 6 and 8. This carriage has a generally planar, vertical rear wall 51 and a peripheral wall 52 projecting therefrom. A central rib 53 extends away from rear wall 51 adjacent the top of the carriage 50. This central rib terminates in an engagement portion 53a for engagement with the engagement member 62 of slide plate 60 as will be described and as can be seen in FIG. 5. On each side of central rib 53 are fitment areas 54 which include an arcuate seat 54a formed between central rib 53 and outer walls 54b,54b for receipt of the tubes 32.

Similarly, lower fitment areas 55 include arcuate seats 55a formed between lower central rib 56 and outer walls 55b, 55b. In this way, the distal ends of tubes 32 can also be seated. This locates the dispensing nozzles 33,33 in dispensing position with the nozzles accessible from the bottom of dispenser 10, as can be seen, for example, in FIGS. 4 and 6 of the drawings.

Finally, carriage 50 has a planar, central, raised area 57 extending from wall 51 which serves as a compression platen against which tube 32 can be compressed, as will be described.

The carriage 50 is mounted on the back plate 20 so as to be translatable from side to side. In that regard, it will be seen that back plate 20 has a vertical wall 22 which depends from the shelf 21 and has transverse upper and lower slots 23a,23b therein. The tube carriage 50 has engagement lugs 58 projecting from the rear of wall 51 and which snap into the slots 23a and 23b, thus permitting the carriage to slide from side to side.

A comparison of FIGS. 1 and 2 of the drawings will note that the selector lever 61 is movable in the recess 17 in the front cover and is, of course, readily accessible from the exterior of the dispenser 10 when the cover is closed.

The slide plate 60, which carries the selector lever 61, is engageable with the projection 53a of the carriage, as noted, by engagement means 62. In that fashion, as the handle 61 and slide plate 60 are moved from side to side, such as can be seen by comparing FIGS. 1 and 2 of the drawings, the tube carriage 50 is likewise moved from side to side. Inasmuch as tubes 32 are securely fitted into the fitments in the carriage, they also move in this fashion to bring one or the other of tubes 32 into selective juxtaposition with the compression member 16a of operating handle 16 by moving the carriage and the tubes a very small distance from one side to the other of the dispenser. Inasmuch as the tubes are flexible, this slight movement does not impair their capability of serving as a conduit for the material.

It should be noted that the handle 16 and its associated structure, such as the compression pad 16a, do not translate laterally. Rather, the tubes are moved to bring the carriage 50, and thus the tubes into juxtaposed position with the compression member 16a so that when the handle 16 is moved to the collapsed position, such as shown in FIG. 7, the selected tube 32 can be collapsed in the compression zone between compression pad 16a and compression platen 57 so that material can be dispensed from the selected tube through the nozzle 33. When it is desired to switch operations and use the bag in the other cartridge 30, it is simply necessary to grasp the selector lever 61 and move it and the carriage 50 to the opposite side of the dispenser.

In this way, it is easily possible to utilize two replacement cartridges in a dispenser of this general type, thus effectively substantially doubling its capacity. In that way also, it is possible to switch from one side to the other in all instances when desired, such as when one of the cartridges is nearly exhausted of material.

It also should be noted that, in the event one desires to selectively dispense more than one type of material from a single dispenser installation, such would be possible, too, in that it would be possible to provide one cartridge 30 with one type of material and the other with another. By utilizing selector lever 61, one or the other could be dispensed as desired.

While a full and complete description of the invention has been set forth in accordance with the dictates of the patent statutes, it should be understood that modifications can be resorted to without departing from the spirit hereof or the scope of the appended claims.

Thus, while soap has been referred to as one of the materials commonly dispensed in an installation of this type, the invention itself is not intended to be limited to the dispensing of any particular material.

What is claimed is:

1. A dispenser for dispensing liquid material from at least two cartridges having compressible tubes through which the material can be dispensed when the tubes are collapsed, comprising:

(a) a movable carriage carried by the dispenser;

(b) fitments carried by said movable carriage for releasably receiving and locating the tubes;

(c) switching means carried by the dispenser for engaging said movable carriage;

(d) said switching means being movable laterally with respect to the dispenser; and (e) compression means carried by the dispenser and being movable into and out of collapsing engagement with one or the other of the tubes.

2. The dispenser of claim 1 wherein said dispenser includes a back plate and a cover, hingedly connected to said back plate for movement between open and closed positions relative thereto.

3. The dispenser of claim 2 wherein said movable carriage is carried by said back plate; and said switching and compression means are carried by said cover.

4. The dispenser of claim 3 wherein said switching means include a slide plate slidably carried on said cover and a selector lever disposed on said slide plate and projecting from one surface of said slide plate through said cover.

5. The dispenser of claim 4 wherein an engagement member is disposed on and projects from the opposed surface of said slide plate.

6. The dispenser of claim 4 wherein said carriage has a centrally disposed projecting rib with an engagement portion on its distal end; said engagement member of said slide plate engages said engagement portion when said cover is in the closed position.

7. The dispenser of claim 1 wherein said back plate has a projecting shelf for receipt of the cartridges and a vertical wall depending from said shelf; and said carriage is slidably attached to said vertical wall.

8. The dispenser of claim 2 wherein an operating handle is pivotally mounted on said cover for movement toward and away from said back plate and said carriage when said cover is in said closed position; and said compression member is carried by said operating handle.

9. The dispenser of claim 8 wherein a compression platen is carried on said carriage.

* * * * *